United States Patent
Seo et al.

(10) Patent No.: US 12,494,183 B2
(45) Date of Patent: Dec. 9, 2025

(54) GLARE PROTECTING APPARATUS AND METHOD FOR CONTROLLING THE SAME

(71) Applicant: SERVORE CO., LTD., Gyeonggi-do (KR)

(72) Inventors: Woon Su Seo, Gyeonggi-do (KR); Jeong Min Seo, Gyeonggi-do (KR)

(73) Assignee: SERVORE CO., LTD., Gyeonggi-do (KR)

( * ) Notice: Subject to any disclaimer, the term of this patent is extended or adjusted under 35 U.S.C. 154(b) by 0 days.

(21) Appl. No.: 16/692,394

(22) Filed: Nov. 22, 2019

(65) Prior Publication Data
US 2020/0380929 A1    Dec. 3, 2020

(30) Foreign Application Priority Data
Jun. 3, 2019   (KR) .................. 10-2019-0065264

(51) Int. Cl.
*G09G 3/36*    (2006.01)
*A61F 9/06*    (2006.01)

(52) U.S. Cl.
CPC ............. *G09G 3/3614* (2013.01); *A61F 9/06* (2013.01); *A61F 9/067* (2013.01); *G09G 2360/14* (2013.01); *G09G 2370/16* (2013.01)

(58) Field of Classification Search
CPC ............ G09G 3/3614; G09G 2360/14; G09G 2370/16; A61F 9/06; A61F 9/067
See application file for complete search history.

(56) References Cited

FOREIGN PATENT DOCUMENTS

| KR | 100679896 | 2/2007 | |
|---|---|---|---|
| KR | 1020160028640 | 3/2016 | |
| KR | 101657141 B1 * | 9/2016 | ............ G02F 1/0102 |

* cited by examiner

*Primary Examiner* — Nathanael R Briggs
(74) *Attorney, Agent, or Firm* — IPLA P.A.

(57) ABSTRACT

A glare protecting apparatus that changes light transmittance of an LCD in order to protect eyes of an operator from light generated from a welding operation, the glare protecting apparatus comprising: a light signal detector that detects light generated during the welding operation by a photosensor; an RF signal detector that detects an RF signal generated during the welding operation via an antenna; a power supply unit that supplies a certain level of drive power to the glare protecting apparatus including the light signal detector and the RF signal detector; an RF detection power-supply switching unit; and a control unit that generates an LCD control signal.

3 Claims, 3 Drawing Sheets

GLARE PROTECTING APPARATUS AND METHOD FOR CONTROLLING THE SAME

CROSS REFERENCE

The present application claims priority to Korean Patent Application No. 10-2019-0065264, filed 3 Jun. 2019, the entire contents of which is incorporated herein by its entirety.

BACKGROUND

The present invention relates to a technology for reducing light transmittance of a front LCD of a welding mask such that light having high luminance, which is generated in a welding operation, is not applied to eyes of an operator, more specifically, for starting a light shading operation based on an RF-detection signal in an initial state of driving a welding machine and then, performing the light shading operation based on one detection signal of a light-detection signal and the RF-detection signal by receiving the light-detection signal and the RF-detection signal by a toggle method.

In general, a welding refers to join two metals by locally heating and dissolving them using a fusible property of the metal. In welding, an intense visible light as well as a harmful light (arc) including UV wavelength band around 380 nm are emitted and the debris is scattered. In this case, when the worker's eyes are exposed to the intense PS harmful light, it may cause eye damage and the debris may damage the eyeballs of the worker.

Therefore, industrial sites require the worker to wear a protective mask for welding to protect their eyes and face from the heat, the debris and the intense harmful light generated during welding or cutting work etc.

FIG. 1 is an example view illustrating a conventional external shape of a welding protection mask (1).

Referring to FIG. 1, the welding protection mask (1) is provided with a glare protecting device (2) at a front surface thereof and is provided with a liquid crystal display (LCD; 3) included in the glare protecting device (2) so as to reduce an illuminance of the light applied to the worker's eyes.

That is, a light sensor (4) provided in the front portion of the glare protecting device (2) detects the light generated by a welding and cutting torch and controls a control circuit inherent in the glare protecting device (2) to darken the LCD (3), thereby adjusting the light transmittance of the LCD (3).

As such, the glare protecting device (2) generally provided in the welding protection mask adjusts the light transmittance of the LCD by using the light detection means for detecting the light generated during welding.

However, when the light transmittance of the LCD is adjusted using only the light detection means, malfunctions frequently occur due to a difference in the detection signals and an interference light that may occur according to the types of welding and welding machine.

For example, in a low current welding, an outdoor welding, and a thin plate welding, the LCD should be transparent. However, there is a malfunction in that the LCD does not become transparent in response to the interference light of the surroundings or the LCD gradually becomes transparent even if it becomes transparent.

In order to solve the above problems, it has been proposed a glare protecting device further including a RF signal detection means.

Patent Literature 1 (Korean Patent registration No. 10-0679896) discloses a configuration in that an electromagnetic wave detection means is operated to monitor a change in an electromagnetic wave signal output from the electromagnetic wave detection means according to the start of the optical detection and thus, the light transmittance of the LCD is changed.

In addition, Patent Literature 2 (Korean Patent registration No. 10-1657141) previously filed by the present applicant discloses a configuration in that it receives signals detected from an optical signal detection part or a RF signal detection part, enters the light shielding mode only when both the optical signal and the RF signal are received, and determines whether to maintain the light shielding mode based on only the RF reception after entering the light shielding mode.

That is, in all of the above Patent Literatures, it performs the light shielding operation using the light detection signal and the RF detection signal and is configured to perform the light shielding operation based on the light detection during the initial driving.

However, during the welding operation, the electromagnetic waves are generally generated first by the welding machine driving and then, the arc light is generated by the actual welding operation. In the case of performing the light shielding operation based on the light detection signal as in the Patent Literatures, the initial shielding speed is slow, which may cause a problem of sensitivity adjustment error at the beginning of the welding operation.

In addition, the above-mentioned Patent Literatures are set to an operating state by continuously applying power to the light detecting means and the RF detecting means during the welding operation. However, since both detection means must be driven in comparison with other conventional glare protecting device for performing the light shielding operation using one detection means, there is a problem in that the power consumption increases.

Also, in general, the shielding degree of the welding mask is preset according to the type of the operation such as a general welding, a grind welding, and a cutting welding etc. or according to the operator's choice and the light transmittance of the LCD is changed in response to the preset shielding degree during the welding operation. At this time, the light shielding degree is set to correspond to the spark generated during the welding operation.

However, when the welding machine is driven, a high intensity light is generated instantaneously compared to the spark generated during the actual welding operation at the time of the RF generation due to the high voltage.

Therefore, when adjusting the light transmittance of the LCD with the light shield corresponding to the spark generated during the actual welding work, the high-intensity light generated at the time of the RF generation before the actual welding work flows into the eyes of the worker wearing the welding protection mask. This can bring a visual pain to the worker's eyes.

PATENT LITERATURE

Patent Literature 1: Korean Patent Registration No. 10-0679896 (Feb. 1, 2007; Title: Apparatus for detecting electromagnetic wave and protecting eyes from glare)
Patent Literature 2: Korean Patent Registration No. 10-1657141 (Sep. 19, 2016; Title: GLARE PROTECTING APPARATUS AND METHOD FOR CONTROLLING THE SAME)

SUMMARY OF THE INVENTION

The present invention is made with consideration for the circumstance described above, and an object thereof is to provide a glare protecting apparatus and a method for controlling the glare protecting apparatus that performs a light shading operation based on detection of an electromagnetic wave in an initial state, stops the detection of the electromagnetic wave when light is detected and performs the light shading operation based on detected light, and repeatedly performs a process of performing the light shading operation due to the detection of the electromagnetic wave when no light is detected during the light shading operation based on the detection of light, and thereby it is possible to more stably protect eyes of an operator while improving a light shading speed of the glare protecting apparatus during a welding operation and minimizing power consumption for operating an electromagnetic detecting unit.

According to an aspect of the invention to achieve the object described above, there is provided a glare protecting apparatus that changes light transmittance of an LCD in order to protect eyes of an operator from light generated from a welding operation, the glare protecting apparatus including: a light signal detector that detects light generated during the welding operation by a photosensor; an RF signal detector that detects an RF signal generated during the welding operation via an antenna; a power supply unit that supplies a certain level of drive power to the glare protecting apparatus including the light signal detector and the RF signal detector; an RF detection power-supply switching unit that is positioned on a power line between the power supply unit and the RF signal detector, is coupled to an output end of the light signal detector, turns "OFF" the power line between the power supply unit and the RF signal detector in a state where a light-detection signal is applied from the light signal detector, and turns "ON" the power line between the power supply unit and the RF signal detector in a state where the light-detection signal is not applied from the light signal detector; and a control unit that generates an LCD control signal based on the light-detection signal or an RF-detection signal and changes the light transmittance of the LCD, wherein the light-detection signal and the RF-detection signal are supplied to the control unit by a toggle method.

Preferably, when the power supply unit is switched from an "OFF" state to an "ON" state, the RF detection power-supply switching unit is set to a connection state between the power supply unit and the RF signal detector such that both the light signal detector and the RF signal detector come into an operation state, and after the light signal detector detects a light signal in the operation state, only one of the light signal detector and the RF signal detector is set to the operation state.

Preferably, when the power supply unit is switched from the "OFF" state to the "ON" state, the control unit first generates an LCD control signal based on the RF-detection signal.

Preferably, the control unit is configured to generate an LCD control signal based on preset light transmittance information so as to change the light transmittance of the LCD and to generate, regarding the RF-detection signal, an LCD control signal corresponding to light transmittance lower than the preset light transmittance.

According to another aspect of the invention to achieve the object described above, there is provided a method for controlling a glare protecting apparatus used for protecting eyes of an operator from light generated from a welding operation, the method including: a first step of setting both a light signal detector and an RF signal detector to an operation state by setting an RF detection power-supply switching unit to an "ON" state such that a power supply unit and the RF signal detector are connected to each other, the RF detection power-supply switching unit being positioned on a power line between the power supply unit and the RF signal detector, when the power supply unit that supplies drive power to the glare protecting apparatus is switched from an "OFF" state to an "ON" state; a second step of outputting an RF-detection signal to a control unit when the RF signal detector detects an RF signal generated during the welding operation in a state where both the light signal detector and the RF signal detector are set to the operation state; a third step of controlling to change light transmittance of an LCD based on the RF-detection signal by the control unit; a fourth step of outputting a light-detection signal to both the power-supply switching unit and the control unit when the light signal detector detects a light signal generated during the welding operation in a state where the RF-detection signal is applied to the control unit; a fifth step of stopping an output of the RF-detection signal from the RF signal detector to the control unit by switching the power line between the power supply unit and the RF signal detector to an "OFF" state based on reception of the light-detection signal by the power-supply switching unit; and a sixth step of controlling to change the light transmittance of the LCD based on the light-detection signal when reception of the RF-detection signal is stopped and the light-detection signal is applied to the control unit, wherein, a stop of the reception of the light-detection signal causes the power line between the power supply unit and the RF-detection signal to be connected to each other, and a process from the third step of controlling to change the light transmittance of the LCD based on the RF-detection signal to the sixth step is repeatedly performed.

Preferably, in the third step, the control unit sets a light shading mode of controlling the light transmittance of the LCD based on the reception of the RF-detection signal and performs a light shading operation of changing the light transmittance of the LCD, and wherein, the light shading operation is performed based on one detection signal of the light-detection signal or the RF-detection signal until the RF-detection signal is not received for a certain time in a state where the power supply unit is switched to the "OFF" state or the reception of the light-detection signal is stopped.

Preferably, light transmittance information corresponding to the welding operation is set in the glare protecting apparatus in advance; when the control unit receives the RF-detection signal in the third step, the control unit calculates RF light transmittance information indicating that the light transmittance is lower than preset light transmittance and controls to change the light transmittance of the LCD such that the light transmittance of the LCD corresponds to the calculated RF light transmittance information; and when the control unit receives the light-detection signal in the sixth step, the control unit controls to change the light transmittance of the LCD such that the light transmittance of the LCD corresponds to the preset light transmittance information.

BRIEF DESCRIPTION OF THE DRAWINGS

The above and other objects, features and advantages of the present invention will be more apparent from the following detailed description taken in conjunction with the accompanying drawings, in which.

REFERENCE SIGNS LIST

Figure 1:
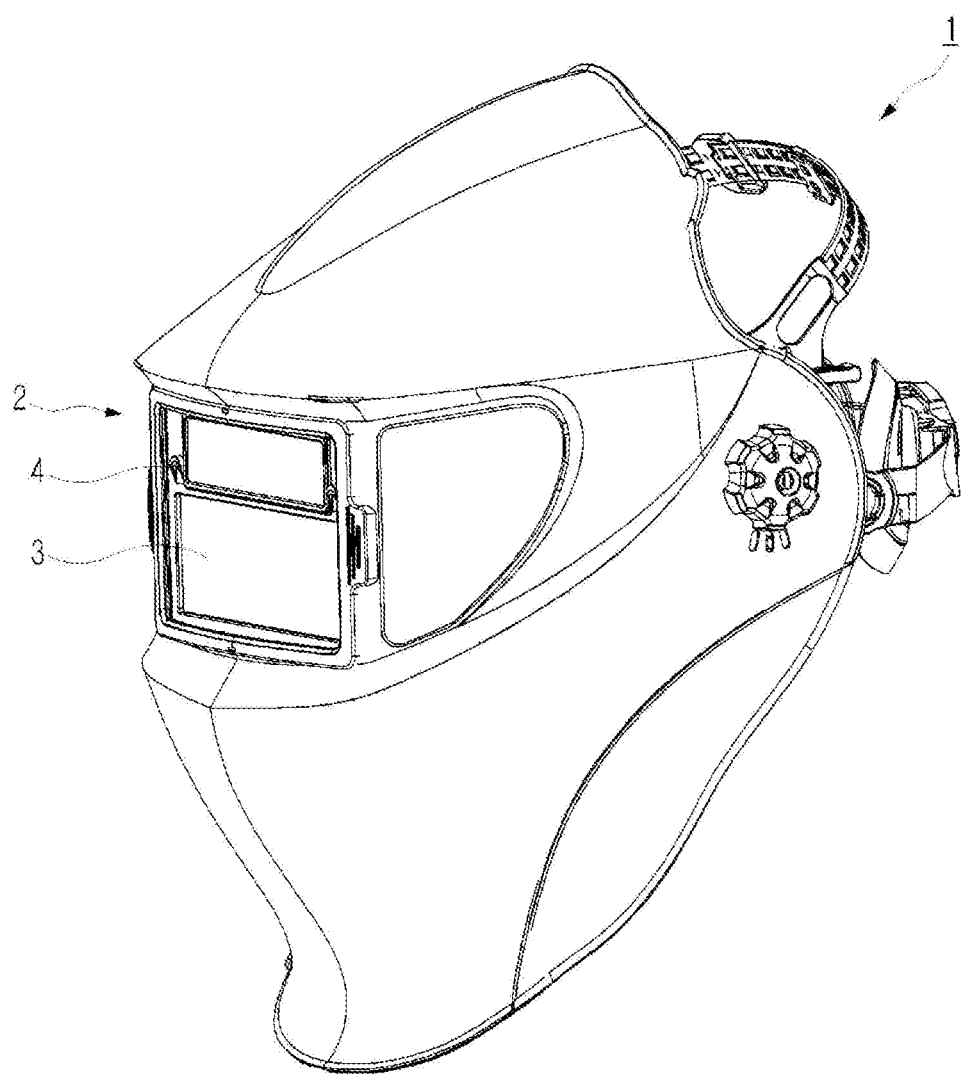
FIG. 1 is an example view illustrating a conventional external shape of a welding protection mask.

100: light signal detector
200: RF signal detector
300: power supply unit
400: RF detection power-supply switching unit
500: LCD driving unit
600: control unit
5: LCD

DETAILED DESCRIPTION OF THE PREFERRED EMBODIMENT

Since the description of the present invention is a mere embodiment for structural and functional description m, it must not be interpreted that the scope of the present invention is limited by the embodiments described in the text. That is, since the embodiments can be variously changed and have various forms, it should be understood that the scope of the invention includes the equivalents for realizing the technical concept. Also, since the specific embodiments do not include all objects and effects presented by the present invention, the scope of the present invention is not limited by them.

Unless differently defined, all the terms used here including technical or scientific terms have the same meaning with what is generally understood by one who has common knowledge in the technical field that this invention belongs to. The terms such as those defined in the dictionary commonly used will be interpreted to have the meanings matching with the meanings in the context of the related technologies. Unless clearly defined in this application, they are not interpreted as ideal or excessively formal meanings.

Figure 2:
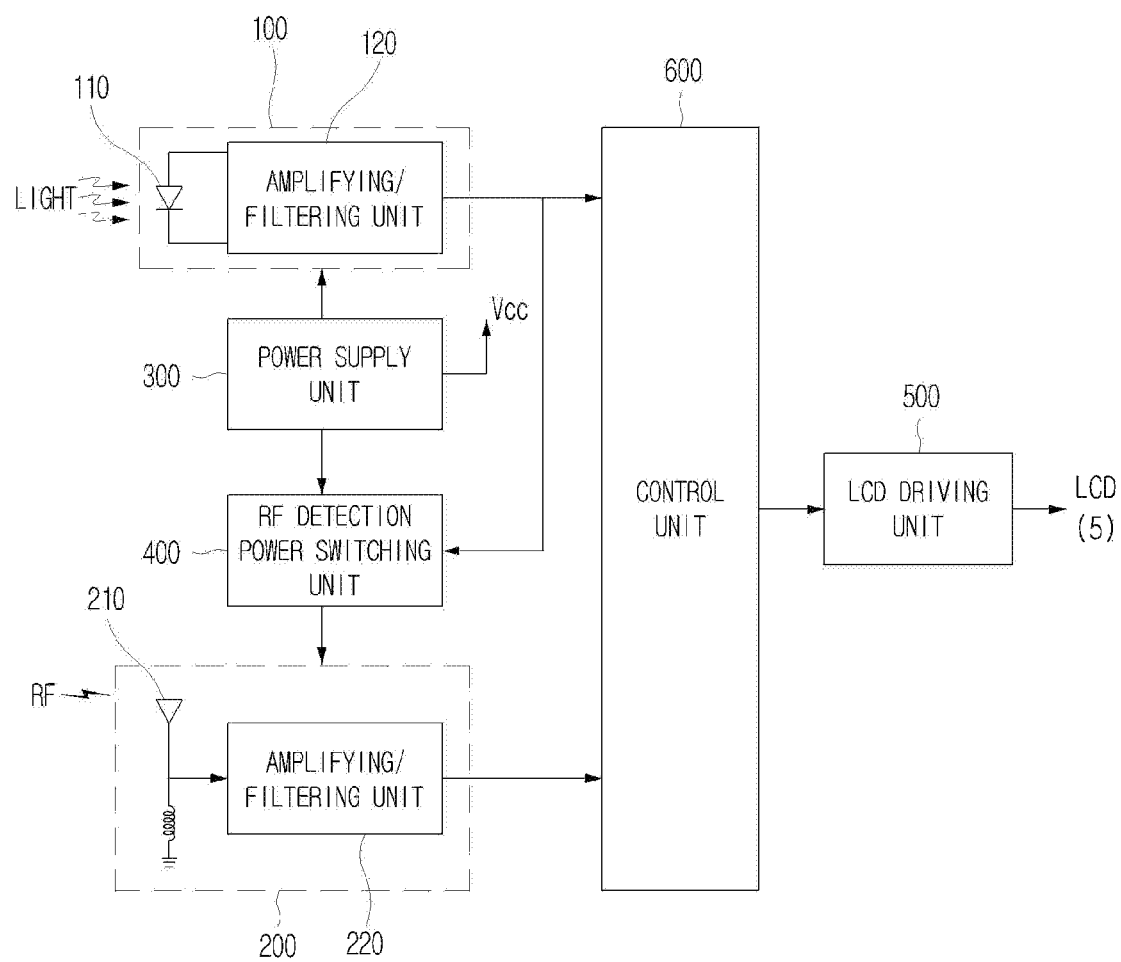
FIG. 2 is a diagram illustrating a functionally divided configuration of a glare protecting apparatus according to a first embodiment of the invention.

FIG. 2 is a diagram illustrating a functionally divided configuration of a glare protecting apparatus according to a first embodiment of the invention.

With reference to FIG. 2, the glare protecting apparatus according to the invention includes a light signal detector (100), an RF signal detector (200), a power supply unit (300), an RF detection power-supply switching unit (400), an LCD driving unit (500), and a control unit (600).

The light signal detector (100) detects light generated during a welding operation and is configured to include an amplifying/filtering unit (120) so as to detect a light signal having an effective wavelength bandwidth from a signal input from a photosensor (110).

The RF signal detector (200) receives an input of an electromagnetic wave generated during the welding operation via an antenna (210) and detects a resonated electromagnetic wave. The RF signal detector (200) is configured to include a resonance circuit and an amplifying/filtering unit (220) so as to receive a frequency having a specific bandwidth from an RF signal which is applied to the antenna (210).

The power supply unit (300) supplies drive power (Vcc) for driving the glare protecting apparatus and supplies the drive power via a power line particularly to the light signal detector (100) and the RF signal detector (200).

The RF detection power-supply switching unit (400) is provided to set ON/OFF of the supply of the power to the RF signal detector (200) and is positioned on a power line between the power supply unit (300) and the RF signal detector (200) so as to connect or disconnect the power line between the power supply unit (300) and the RF signal detector (200).

In this case, the RF detection power-supply switching unit (400) is coupled to an output end of the light signal detector (100), is set to "ON" such that the power line between the power supply unit (300) and the RF signal detector (200) is connected in a state where a light-detection signal is applied from the light signal detector (100), and is set to "OFF" such that the power line between the power supply unit (300) and the RF signal detector (200) is disconnected in a state where the light-detection signal is not applied from the light signal detector (100).

In other words, in an initial state where the power supply unit (300) is switched from an "OFF" state to an "ON" state, the RF detection power-supply switching unit (400) sets the power supply unit (300) and the RF signal detector (200) to a connection state, and thereby both the light signal detector (100) and the RF signal detector (200) come into an operation state. Besides, when the light signal detector (100) detects the light signal after the initial state and then a light-detection signal is detected, the RF detection power-supply switching unit (400) is switched to an "OFF" state, and thus only one of the light signal detector (100) and the RF signal detector (200) is set to the operation state.

In addition, when the power supply unit (300) is switched from the "ON" state to the "OFF" state, the RF detection power-supply switching unit (400) can be switched to an "ON" state such that the power line between the power supply unit (300) and the RF signal detector (200) is connected.

The LCD driving unit (500) adjusts light transmittance of an LCD so as to reduce luminance of light which is applied to eyes of an operator through the LCD based on a control signal of the control unit (600).

The control unit (600) generates an LCD control signal based on the light-detection signal applied from the light signal detector (100) and an RF-detection signal applied from the RF signal detector (200) and controls to change the light transmittance of an LCD (5).

In this case, the light-detection signal and the RF-detection signal are transmitted to the control unit (600) by a toggle method, and thereby the control unit (600) generates and transmits a control signal for adjusting the light transmittance to the LCD driving unit (500) based on one detection signal of the RF-detection signal or the light-detection signal.

In addition, in a standby state where the power supply unit (300) is switched to the "ON" state such that power is supplied to both the light signal detector (100) and the RF signal detector (200), the control unit (600) controls to perform a light shading operation based on one detection signal which is first received of the light-detection signal or the RF-detection signal. Desirably, the control unit (600) can generate the LCD control signal first based on the RF-detection signal after the power supply unit (300) is switched to the "ON" state.

In addition, in a state where first light transmittance corresponding to the welding operation is set in advance, the control unit (600) can generate an LCD control signal corresponding to second light transmittance lower than the preset first light transmittance by a certain level when the light shading operation is performed in response to the RF-detection signal. For example, in a state where current light transmittance is set at a level of "9" in advance and the RF detection signal is applied to the control unit (600), the control unit (600) can change a state of the LCD such that the LCD has a degree of light shade with light transmittance at a level of "11" higher than the level of "9" by a certain level, for example, "two" levels.

Figure 3:
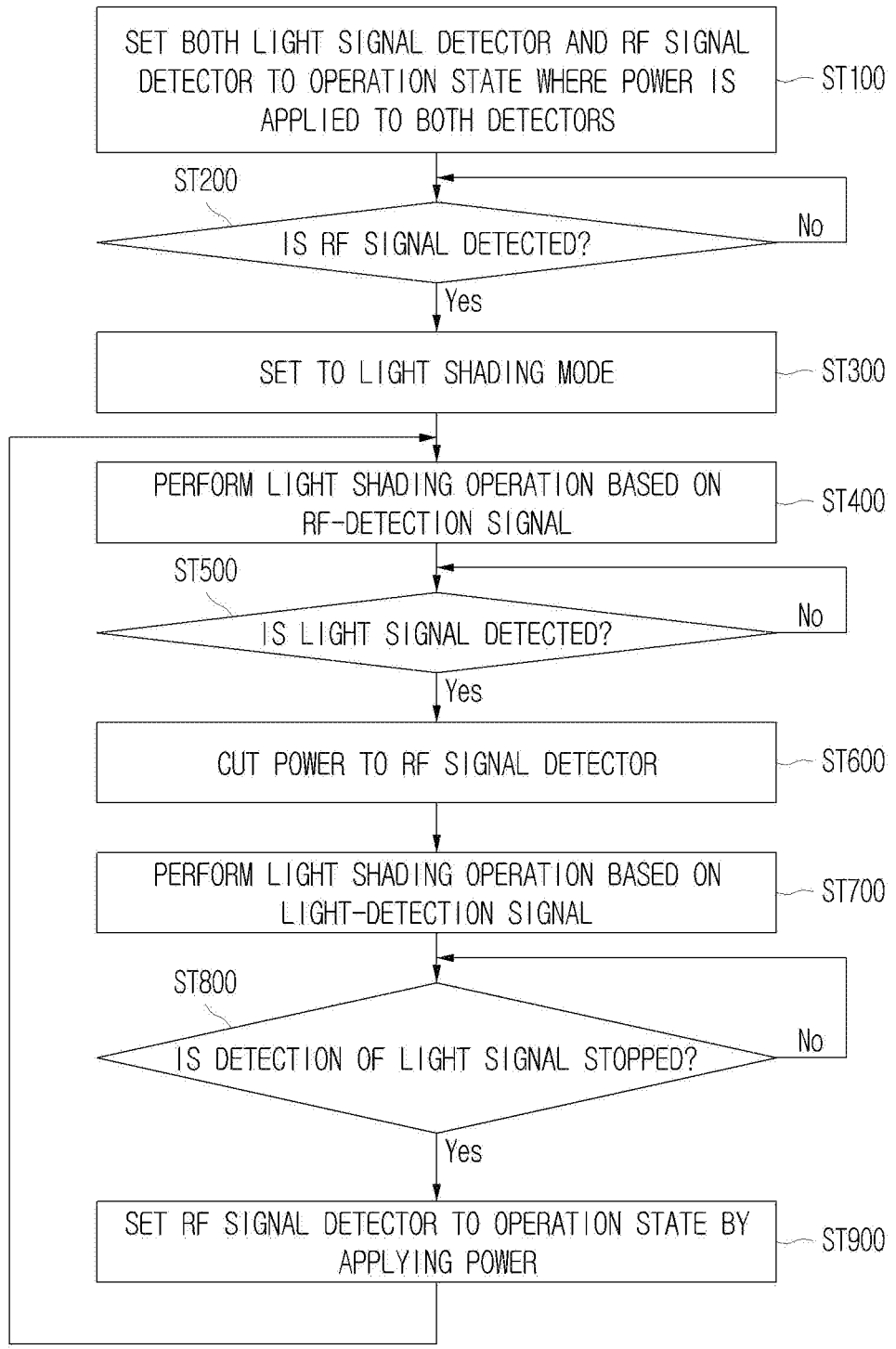
FIG. 3 is a diagram for explaining a control operation of the glare protecting apparatus illustrated in FIG. 2.

Subsequently, a method for controlling a light shading function of the glare protecting apparatus according to the invention will be described with reference to a flowchart illustrated in FIG. 3.

First, when an operator wears a welding mask equipped with the glare protecting apparatus and power is supplied to the power supply unit (300) that supplies drive power to the glare protecting apparatus such that the power supply unit is switched from the "OFF" state to the "ON" state, the RF detection power-supply switching unit (400) that is positioned on the power line between the power supply unit (300) and the RF signal detector (200) connects the power supply unit (300) and the RF signal detector (200), thereby, setting both the light signal detector (100) and the RF signal detector (200) to the operation state (ST100). In other words, at an initial time point when the power supply unit (300) is switched from the "OFF" state to the "ON" state, the light-detection signal is yet to be applied from the light signal detector (100), and thus the RF detection power-supply switching unit (400) is automatically set to a connection state in which the power line between the power supply unit (300) and the RF signal detector (200) is connected.

In this state, when the operator turns "ON" a switch of a welding machine, an RF signal is generated at the same time of an operation of the welding machine, and the RF signal detector (200) generates and outputs the RF signal to the control unit (600) (ST200).

When the control unit (600) receives an RF-detection signal, the control unit sets the light shading mode of controlling the light transmittance of the LCD in response to the RF-detection signal (ST300). In other words, after the light shading mode is set, the control unit (600) starts a light shading operation of controlling the light transmittance of the LCD.

In other words, the control unit (600) generates the control signal for adjusting the light transmittance of the LCD based on the RF-detection signal and transmits the control signal to the LCD driving unit (500) (ST400). The LCD driving unit (500) adjusts the light transmittance of the LCD based on the control signal corresponding to the RF-detection signal.

Then, when the operator positions the welding machine with respect to a welding target, arc is generated, and thereby the light signal detector (100) detects light in a preset wavelength bandwidth and outputs the light-detection signal to both the control unit (600) and the RF detection power-supply switching unit (400) (ST500).

The RF detection power-supply switching unit (400) switches the power line between the power supply unit (300) and the RF signal detector (200) to the "OFF" state based on reception of the light-detection signal (ST600). Hence, power is not applied to the RF signal detector (200), the RF signal detector (200) is set to a non-operating state, and thereby the RF signal detector (200) stops outputting of the RF-detection signal to the control unit (600).

In addition, when the light-detection signal is received and the reception of the RF-detection signal from the RF signal detector (200) is stopped in the control unit (600), the control unit generates a control signal for adjusting the light transmittance of the LCD based on the light-detection signal and transmits the control signal to the LCD driving unit (500) (ST700). The LCD driving unit (500) adjusts the light transmittance of the LCD based on the control signal corresponding to the light-detection signal.

Then, when the operator separates the welding machine from the welding target by a certain distance while performing the welding operation for a certain time, generation of arc is stopped. Thus, the light signal is not detected by the light signal detector (100), and the light-detection signal is not output.

As described above, when the light signal detector (100) does not output the light-detection signal (ST800), the RF detection power-supply switching unit (400) connects the power line between the power supply unit (300) and the RF signal detector (200) and sets the RF signal detector (200) to an operation state (ST900).

In this case, power is continuously applied to the welding machine in a state where the welding machine is separated from the welding target by a certain distance, and thus the RF signal is continuously generated. In this manner, the RF signal detector (200) detects and outputs a certain level of the RF signal to the control unit (600).

Besides, when reception of the light-detection signal is stopped and the RF-detection signal is received by the control unit (600), the control unit generates a control signal for adjusting the light transmittance of the LCD based on the RF-detection signal and transmits the control signal to the LCD driving unit (500), and thereby an operation from ST400, in which the light shading operation of adjusting the light transmittance of the LCD is performed, to the last step is repeatedly performed until power supply to the glare protecting apparatus is turned "OFF". In other words, until the power supply unit (300) is switched to the "OFF" state after the light shading mode is set, the light shading operation is performed based on one detection signal of the light-detection signal and the RF-detection signal.

In addition, the control unit (600) can repeatedly perform the operation from ST400, in which the light shading operation of adjusting the light transmittance of the LCD, to the last step, until the RF-detection signal is not received for a certain time in a state where the switch of the welding machine is switched to the "OFF" state, that is, in a state where reception of the light-detection signal is stopped.

On the other hand, in the invention, in the ST Steps, when the light-detection signal is not generated or the RF-detection signal is not generated for a certain time or longer, the control unit (600) determines whether power supply to the glare protecting apparatus is stopped because the welding operation is finished or the like and the power supply unit (300) is switched to the "OFF" state, and the control unit turns off the light shading mode when the power supply unit is switched to the "OFF" state. In this case, power is not applied to the RF detection power-supply switching unit (400), and thereby the RF detection power-supply switching unit (400) can be switched to the "ON" state in which the power line between the light signal detector (100) and the RF signal detector (200) is connected.

According to the invention, it is possible to provide a glare protecting apparatus that can more stably provide a light shading function by improving a start speed of the light shading function, by performing a light shading operation of the glare protecting apparatus with a start of detection of an RF signal during a welding operation.

In addition, the light shading operation is performed by using both a light-detection signal and an RF-detection signal but power supply to RF detecting means is stopped when light is detected, thereby it is possible to minimize power consumption for operating the glare protecting apparatus.

In addition, it is possible to more stably protect eyes of an operator from light having high intensity, which is generated by RF, by controlling an LCD such that the LCD has light transmittance lower than the light-detection signal during the light shading operation in response to the RF-detection signal.

While the present invention has been described with respect to the specific embodiments, it will be apparent to those skilled in the art that various changes and modifications may be made without departing from the spirit and scope of the invention as defined in the following claims.

What is claimed is:

1. A method for controlling a glare protecting apparatus used for protecting eyes of an operator from light generated from a welding operation, the method comprising:
   a first step of setting both a light signal detector and an RF signal detector to an operation state by setting an RF detection power-supply switching unit to an "ON" state such that a power supply unit and the RF signal detector are connected to each other, the RF detection power-supply switching unit being positioned on a power line between the power supply unit and the RF signal detector, when the power supply unit that supplies drive power to the glare protecting apparatus is switched from an "OFF" state to an "ON" state;
   a second step of outputting an RF-detection signal to a control unit when the RF signal detector detects an RF signal generated during the welding operation in a state where both the light signal detector and the RF signal detector are set to the operation state;
   a third step of controlling to change light transmittance of an LCD based on the RF-detection signal by the control unit;
   a fourth step of outputting a light-detection signal to both the power-supply switching unit and the control unit when the light signal detector detects a light signal generated during the welding operation in a state where the RF-detection signal is applied to the control unit;
   a fifth step of stopping an output of the RF-detection signal from the RF signal detector to the control unit by switching the power line between the power supply unit and the RF signal detector to an "OFF" state based on reception of the light-detection signal by the power-supply switching unit; and
   a sixth step of controlling to change the light transmittance of the LCD based on the light-detection signal when reception of the RF-detection signal is stopped and the light-detection signal is applied to the control unit,
   wherein, a stop of the reception of the light-detection signal causes the power line between the power supply unit and the RF-detection signal to be connected to each other, and a process from the third step of controlling to change the light transmittance of the LCD based on the RF-detection signal to the sixth step is repeatedly performed.

2. The method for controlling a glare protecting apparatus according to claim 1, wherein, in the third step, the control unit sets a light shading mode of controlling the light transmittance of the LCD based on the reception of the RF-detection signal and performs a light shading operation of changing the light transmittance of the LCD, and
   wherein, the light shading operation is performed based on one detection signal of the light-detection signal or the RF-detection signal until the RF-detection signal is not received for a certain time in a state where the power supply unit is switched to the "OFF" state or the reception of the light-detection signal is stopped.

3. The method for controlling a glare protecting apparatus according to claim 1, wherein light transmittance information corresponding to the welding operation is set in the glare protecting apparatus in advance,
   wherein, when the control unit receives the RF-detection signal in the third step, the control unit calculates RF light transmittance information indicating that the light transmittance is lower than preset light transmittance and controls to change the light transmittance of the LCD such that the light transmittance of the LCD corresponds to the calculated RF light transmittance information, and
   wherein, when the control unit receives the light-detection signal in the sixth step, the control unit controls to change the light transmittance of the LCD such that the light transmittance of the LCD corresponds to the preset light transmittance information.

* * * * *